Nov. 5, 1935.  C. B. GRAY  2,019,781
CUTTING MACHINE
Original Filed May 8, 1933
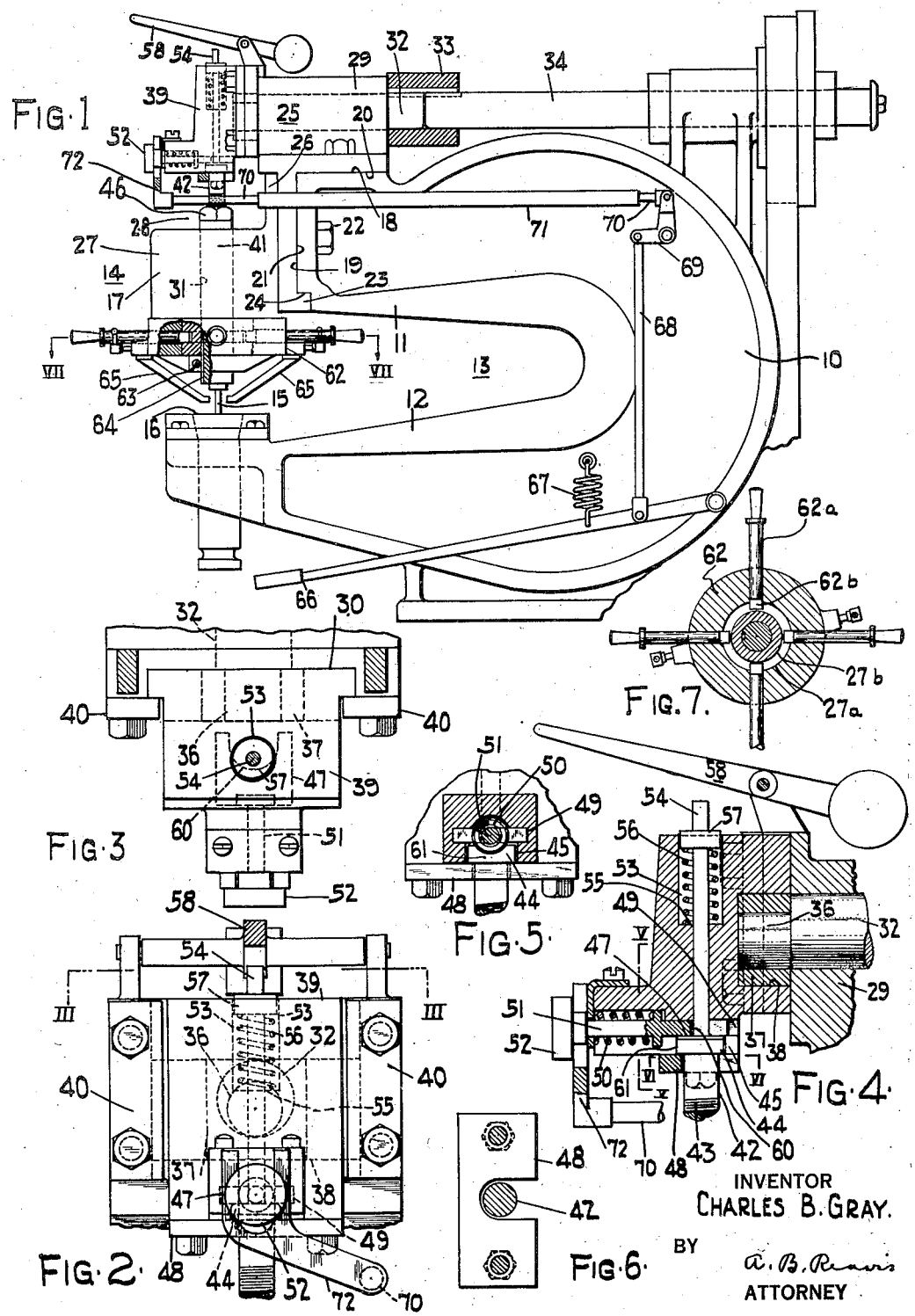
INVENTOR
CHARLES B. GRAY.
BY
A. B. Reavis
ATTORNEY Patented Nov. 5, 1935

2,019,781

UNITED STATES PATENT OFFICE 2,019,781

CUTTING MACHINE

Charles B. Gray, Millbourne, Pa.

Original application May 8, 1933, Serial No. 669,880, now Patent No. 1,977,795. Divided and this application October 20, 1934, Serial No. 749,168

7 Claims. (Cl. 164—47)

My invention relates to cutting machines of the reciprocatory punch type, and this application is a division of my application Ser. No. 669,880, filed May 8, 1933, for Cutting machines.

Machines for cutting sheet or plate material, such as metal, by the use of a reciprocatory tool of the punch type having front cutting and back pilot portions are well known. In order that the line of cutting may be varied, it is desirable that the tool be turned, and this may be effectively accomplished by the means disclosed and claimed in my Patent No. 1,849,829, granted March 15, 1932. Heretofore, with machines of this general character, it has been customary to cast or cut out a C frame and modify the upper arm suitably for the ram and associated working parts, that is, manufacture has been a unitary proposition in which the frame must have a large amount of work performed thereon, the frame really being inseparable mechanically from the head and the working parts carried thereby. Production of machines may be facilitated and distribution may be economically effected by manufacturing the frame and the head construction separately. A given frame may be used with several head constructions of different sizes so that greater latitude in manufacture is possible. Since most of the very accurate machine work, as well as most of the machine work, must be performed on the head construction and the parts thereof, separate production facilities may be used for the head constructions and the frames. Furthermore, as the frame is the heaviest part and as it may be produced in a wide variety of shops, greater economy may be served by providing the frame locally and shipping only the head construction. Accordingly, it is an object of the present invention to provide a machine of the character indicated wherein the frame and the head construction are constructed and arranged for separate manufacture.

A further object of my invention is to provide a head construction for a machine of the character indicated and which includes a body having upper and lower portions, the upper portion carrying a reciprocatory crosshead and the driving mechanism therefor and the lower part carrying the ram, and the body being provided with features permitting of ready attachment to and detachment from the upper arm of a frame.

These and other objects are effected by my invention as will be apparent from the following description and claims taken in connection with the accompanying drawing in which—

Fig. 1 is a side elevational view of a machine incorporating my improved head construction;

Fig. 2 is a detail elevational view of the head construction viewed from the front;

Fig. 3 is a sectional view taken along the line III—III of Fig. 2 and showing the head construction in plan;

Fig. 4 is a vertical sectional view of the head construction showing interior working parts;

Fig. 5 is a sectional view taken along the line V—V of Fig. 4; and

Fig. 6 is a detail view taken along the line VI—VI of Fig. 4.

Fig. 7 is a sectional view taken along line VII—VII of Fig. 1.

Referring now to the drawing more in detail, I show a machine having a frame 10 provided with upper and lower arms 11 and 12 with an intervening throat 13. The upper arm 11 carries, at its outer end, the detachable head construction or aggregate, at 14, having a tool 15 cooperating with the die 16 carried by the lower arm 12.

The head construction, at 14, includes a body 17 carrying working parts hereinafter referred to. The body 17 and the upper arm 11 are provided with cooperating seating faces serving to position the head construction, and preferably abutment means is provided to secure transmission of cutting stresses directly from the head construction to the upper arm without such stresses being imposed on the means for detachably fastening the head construction to the upper arm. To this end and by way of example, I show the outer end portion of the upper arm having a top horizontal surface 18 and an end vertical surface 19 against which are seated the horizontal and vertical surfaces 20 and 21, respectively, formed on the body 17, the cooperating surfaces and the fastening screws or bolts 22 correctly positioning the head construction. To provide for the transmission of cutting stresses directly from the head construction to the upper arm, I show an abutment 23 joined to the body 17 and engaging underneath an abutment surface 24 formed on the upper arm. The abutment 23 preferably takes the form of a flange integral with the body so that the body and the upper arm connected by tongue-and-groove joint portions detachably fastened together by the screw means 22.

The body 17 comprises an upper portion 25 joined by connecting structure 26 to a lower portion 27 so as to provide a space 28 affording access to parts for making adjustments as hereinafter pointed out.

The upper portion 25 is provided with a horizontal journal bearing 29 and a vertical crosshead guide 30 and the lower portion 27 is provided with a vertical ram guide bore 31, the latter preferably being cylindrical.

Referring now to the working parts carried by the body 17, a stub shaft 32 is fitted in the bearing 29. One end of the stub shaft is connected by a detachable coupling 33 to the power shaft 34 mounted on the frame 10. The other end of the stub shaft is provided with an eccentric 36 journalled in a shoe 37, the latter being slidable in a transverse guide 38 formed in the crosshead 39 fitting said vertical crosshead guide 30. The crosshead guide 30 preferably includes detachable strips 40 providing for assembling and dismantling said structure for converting rotary motion into reciprocatory motion.

A ram 41, preferably cylindrical, fits the bore 31 and carries the tool 15 at its lower end. The rod 42 is connected by means of threads 43 to the upper end of the ram, it extends across said space 28, and it is provided with a swivel head 44 at its upper end disposed in the socket 45 at the lower end of the crosshead 39. The swivel connection makes it possible to turn the ram about its longitudinal axis and relatively to the crosshead while the machine is in operation.

The crosshead 39, the rod 42, and the ram 41 constitute a cross head and ram aggregate whose over-all length may be varied by adjustment of the rod relatively to the ram to suit the requirements of the tool. A desired length is maintained by the jamb nut 46, which locks the threaded connection between the rod and the ram. As the nut 46 and a sufficient portion of the rod 42 to provide for turning of the latter are in said space 28, the threaded connection and its locking means are readily accessible for length adjustment of the aggregate.

The socket 45 for the swivel head 44 is normally provided by the lower surface of the gag 47 and the upper surface of the plate 48, such surfaces abutting the upper and lower surfaces of the swivel head. The plate 48 is detachably connected to the lower end of the crosshead and it is notched to receive the rod 42 and fit underneath the swivel head.

The crosshead 39 has a transverse guide 49 for the gag 47, the latter being normally biased to position in abutting relation with the top of the swivel head by means of the spring 50. The gag may be retracted against the force of the spring to clear the top of the swivel head, a pull rod 51 having an external knob 52 being provided for this purpose.

Means is provided to bias the ram and the rod upward to engage the top surface of the swivel head 44 with the crosshead structure as soon as the gag is retracted. By way of example, I show the crosshead 39 provided with a vertical bore 53 within which is disposed the rod 54 having its lower end connected to the swivel head and having its upper end extending above the upper end of the crosshead. The bore has an upwardly facing shoulder 55 against which is seated the spring 56 and the upper end of the spring engages a collar 57 on the rod 54. The rod 54 is moved downwardly against the force of the spring by any suitable means. For example, I show a lever 58 serving this purpose, the lever being pulled downwardly by the operator to engage the top end of the rod and then to move the rod and the ram downwardly relatively to the crosshead.

With the gag 47 in retracted position, the spring 56 is effective to shorten the over-all length of the crosshead and ram aggregate so that cutting may cease without stopping the machine. Not only is this arrangement useful in positioning work, particularly in making inside cuts, but it serves the purpose of a clutch as well for the reason that it is unnecessary to stop the machine incident to changing work.

When the gag is retracted and the swivel head is in its upper position relatively to the crosshead, the inner end 60 of the gag abuts the peripheral surface 61 of the swivel head; and, as soon as the upper surface of the swivel head clears the lower surface of the gag when the ram is being pushed downwardly by the lever 58, the gag moves into position abutting the top of the swivel head.

The lower portion 27 of the body has mounted thereon the swivel ring 62 provided with a spline or key 63 fitting the longitudinal groove 64 formed in the ram 41. The operator manipulates the swivel ring to turn the ram and the tool carried thereby, the swivel connection between the ram and the crosshead permitting of such turning as already pointed out. The swivel ring 62 also carries strippers 65 with the result that a predetermined positional relation of the stripper or strippers and the tool is maintained with turning of the ram and the tool due to operation of the ring. The swivel ring is preferably mounted as follows: The body portion has a journal portion 27a turned thereon with an annular groove 27b. The swivel ring 62 fits the journal portion and the inner ends of the handles 62a have key portions 62b fitting the groove 27b. In assembling the body portion and the swivel ring, these parts are brought into proper relation and the handles are inserted and locked to the swivel ring, the key portions of the handles entering the groove.

Manipulation of the gag may be made easier by providing for treadle disengagement. To this end, I show a treadle 66 biased by a spring 67 and connected by a link 68 through the bell crank 69 to the link 70 slidable in the guide 71 and having a yoke 72 engaging behind the swivel head 52. By depressing the treadle 66, the linkage is operated to disengage the gag.

From the foregoing, it will be apparent that the parts of my improved machine requiring the most machining and the greatest degree of precision in manufacture are embodied in the head construction aggregate; and, as the latter, due to the detachable joint between it and the upper arm of the frame and to the detachable coupling between its stub shaft and the power shaft, is capable of manufacture separately from the remainder of the machine, it is possible to place manufacture and distribution on a very economical basis. Furthermore, greater latitude of construction is possible for the reason that a given frame may be suitable for any one of a number of different-sized head constructions. Separateness of the head construction is desirable from the standpoint of the user for the reason that such head construction may be replaced or taken off as a unit for repair without upsetting the machine as a whole, and a suitable range of head construction sizes may be provided for a single machine, whereby a machine may be readily adapted to cut different materials and particularly stock of different thicknesses.

What I claim is:

1. In a machine of the character described, a frame having upper and lower arms; a die carried by the lower arm; a head aggregate formed separately from the frame and having a tool cooperating with the die; said head aggregate including a body having an upper horizontal portion and a lower vertical portion, the upper portion having a horizontal bearing and a vertical crosshead guide and the lower portion having a vertical ram guide bore, a shaft carried by said bearing, a crosshead fitting the crosshead guide, means for converting rotary motion of the drive shaft into reciprocatory motion of the crosshead, a ram fitting the ram guide bore, and means for connecting the upper end of the ram to the lower end of the crosshead so that the ram is reciprocated by the crosshead, the lower end of the ram carrying said tool; means for positioning the body vertically and horizontally in one direction with respect to the frame including cooperating horizontal and upright seating faces formed on the body and the arm, respectively, said horizontal seating faces being provided at the top side of the upper arm and at the lower side of the upper portion of the body and said upright seating faces being provided at the outer end of the upper arm and at the adjacent side of the lower portion of the body; and screw means for fastening the body to the upper arm and serving to locate the body in the remaining horizontal direction relatively to the frame.

2. The combination as claimed in claim 1 with abutment means for transmitting cutting stresses directly from the body to the upper arm in order to relieve the screw means of such stresses.

3. In a machine of the character described, a frame having upper and lower arms; a drive shaft carried by the frame; a die carried by the lower arm; a head aggregate formed separately from the frame and having a tool cooperating with the die; said head aggregate including a body having an upper horizontal portion and a lower vertical portion, the upper portion having a horizontal bearing and a vertical crosshead guide and the lower portion having a vertical ram guide bore, a stub shaft carried by said bearing, a crosshead fitting the crosshead guide, means for converting rotary motion of the stub shaft into reciprocatory motion of the crosshead, a ram fitting the ram guide bore and carrying said tool at its lower end, and means for connecting the upper end of the ram to the lower end of the crosshead; a detachable coupling between the stub shaft and the drive shaft; means for positioning the body vertically and horizontally in one direction with respect to the frame and including cooperating horizontal and upright seating faces formed on the body and on the upper arm, respectively, said horizontal seating faces being provided at the top side of the upper arm and at the lower side of the upper portion of the body and said upright seating faces being provided at the outer end of the upper arm and at the adjacent side of the lower portion of the body; and screw means for fastening the body to the upper arm and serving to position the body in the remaining horizontal direction relatively to the frame.

4. In a machine of the character described, a frame having upper and lower arms; a die carried by the lower arm; a head aggregate formed separately from the frame and having a tool cooperating with the die; said head aggregate including a body having an upper horizontal portion and a lower vertical portion, the lower vertical portion including a lower enlarged part and a neck part connecting the upper end of the enlarged part to the horizontal portion, the upper portion having a horizontal bearing and a vertical crosshead guide and the enlarged part of the vertical portion having a vertical ram guide bore, a shaft carried by said bearing, a crosshead fitting the crosshead guide, means for converting rotary motion of the shaft into reciprocatory motion of the crosshead, a ram fitting the ram guide bore and carrying said tool at its lower end, a rod threaded to the upper end of the ram, a jamb nut for locking the rod and the ram in adjusted position, the upper end of said ram and said jamb nut being disposed adjacent to the upper end of the enlarged part and the neck part whereby the upper end of the ram, the rod, and the jamb nut are accessible to effect vertical adjustments of the ram and means for transmitting motion from the crosshead to the rod including a gag carried by the cross head and normally interposed between the upper end of the rod and the crosshead; means for positioning the body vertically and horizontally in one direction with respect to the upper arm of the frame and including cooperating horizontal and upright seating faces formed on the body and the upper arm, respectively, said horizontal seating faces being provided at the top side of the upper arm and at the lower side of the upper portion of the body and said upright seating faces being provided at the outer end of the upper arm and at the adjacent side of the lower portion of the body; screw means for fastening the body to the upper arm and serving to position the body in the remaining horizontal direction with respect to the frame; and an abutment carried by the lower part of the vertical portion of the body and engaging a downwardly-facing abutment surface formed on the upper arm for transmitting cutting stresses directly from the body to the upper arm in order to relieve the screw means of such stresses.

5. In a machine of the character described, a frame having upper and lower arms; a die carried by the lower arm; a head aggregate formed separately from the frame and having a tool cooperating with the die; said head aggregate including a body having upper and lower portions, the upper portion having a horizontal bearing and a vertical crosshead guide and the lower portion having a vertical cylindrical ram guide bore, a shaft carried by said bearing, a crosshead fitting the crosshead guide, a cylindrical ram fitting the ram guide bore and carrying said tool at its lower end, means for transmitting motion from the lower end of the crosshead to the upper end of the ram and including a swivel connection providing for turning of the ram about its axis relatively to the crosshead, a swivel ring mounted on the lower body portion, and a key carried by the swivel ring and fitting a groove provided in the ram; and means providing a detachable joint between the body of the head aggregate and the outer end of the upper arm of the frame.

6. In a machine of the character described, a frame having upper and lower arms; a die carried by the lower arm; a head aggregate formed separately from the frame and having a tool cooperating with the die; said head aggregate including a body having upper and lower portions with a separating space, the upper portion having a horizontal bearing and a vertical crosshead guide and the lower portion having a vertical cylindrical ram guide bore, a stub shaft fitting the bearing, a crosshead carried by the crosshead guide, means for converting rotary motion of the stub shaft into reciprocatory motion of the crosshead, a cylindrical ram fitting the ram guide bore and carrying said tool at its lower end, a rod threaded to the upper end of the ram, means for locking the rod and the ram in relative adjusted positions, a swivel head on the rod, means at the lower end of the crosshead providing a socket for the swivel head and including a gag carried by the crosshead and normally interposed between the top of the swivel head and the crosshead, and means carried by the lower body portion for turning the ram; said rod and the locking means being sufficiently exposed in said space to provide access thereto to effect relative adjustment of the ram and of the rod; a power shaft mounted on the upper arm; a detachable coupling between the power shaft and the stub shaft; and means providing a detachable joint between said body and the upper arm.

7. In a machine of the character described, a frame having upper and lower arms, a body connected to the upper arm and having a vertical cylindrical ram guide bore, a ram fitting the bore, a die carried by said lower arm, a tool of the punch type cooperating with the die and carried by the lower end of the ram, said body having a journal portion at its lower end and the journal portion having an annular groove formed therein, a swivel ring fitting the journal portion, a spline connection between the swivel ring and the ram, said swivel ring having one or more radial openings therein for alignment with the annular groove when the ring is properly positioned on the journal portion, and a handle element extending through each opening and having its inner end fitting the groove in order to provide a key connection between the swivel ring and the journal portion.

CHARLES B. GRAY.